United States Patent [19]

Ogawa

[11] Patent Number: 5,311,230
[45] Date of Patent: May 10, 1994

[54] ZOOM LENS CAMERA

[75] Inventor: Kimiaki Ogawa, Tokyo, Japan

[73] Assignee: Asahi Kogaku Kogyo Kabushiki Kaisha, Tokyo, Japan

[21] Appl. No.: 802,713

[22] Filed: Dec. 6, 1991

Related U.S. Application Data

[63] Continuation of Ser. No. 533,785, Jun. 6, 1990, abandoned.

[30] Foreign Application Priority Data

Jun. 9, 1989 [JP] Japan ............... 1-148102

[51] Int. Cl.⁵ .............................................. G03B 1/18
[52] U.S. Cl. ........................................... 354/195.12
[58] Field of Search ............... 354/400, 195.1, 195.12; 364/525; 350/429, 430; 359/676, 696, 697

[56] References Cited

U.S. PATENT DOCUMENTS

| | | | |
|---|---|---|---|
| 4,002,405 | 1/1977 | Stahl | 354/195.12 |
| 4,161,756 | 7/1979 | Thomas | 354/195.12 |
| 4,206,982 | 6/1980 | Osanai | 352/140 |
| 4,329,029 | 5/1982 | Haskell | 354/23 D |
| 4,446,526 | 5/1984 | Iwanade | 364/525 |
| 4,868,592 | 9/1989 | Suzuki et al. | 354/400 |
| 4,936,664 | 6/1990 | Haraguchi et al. | 354/429 |
| 4,937,602 | 6/1990 | Himuro et al. | 354/195.1 |
| 4,942,417 | 7/1990 | Miyayawa et al. | 354/195.1 X |
| 4,944,030 | 7/1990 | Haraguchi et al. | 354/403 |
| 4,975,724 | 12/1990 | Hirasawa et al. | 354/400 |

FOREIGN PATENT DOCUMENTS

| | | |
|---|---|---|
| 2611639 | 9/1977 | Fed. Rep. of Germany . |
| 2344859 | 10/1977 | France . |
| 1532576 | 11/1978 | United Kingdom . |
| 2014808 | 8/1979 | United Kingdom . |
| 2176311 | 12/1986 | United Kingdom . |
| 8707036 | 11/1987 | World Int. Prop. O. . |
| 8707038 | 11/1987 | World Int. Prop. O. . |

Primary Examiner—David M. Gray
Attorney, Agent, or Firm—Sandler, Greenblum & Bernstein

[57] ABSTRACT

A zoom lens camera has an input for inputting a zooming speed. This inputted zooming speed is stored in a memory. A zooming operation is then controllable in accordance with the zooming speed which is stored in memory.

26 Claims, 6 Drawing Sheets

ZOOM LENS CAMERA

This application is a continuation of application Ser. No. 07/533,785, filed Jun. 6, 1990, now abandoned.

BACKGROUND OF THE INVENTION

1. Field of the Invention

The present invention relates to a zoom lens camera having a power zooming function.

2. Description of Related Art

In a zoom lens camera having a power zooming function, the angle of view with respect to an object can be continuously changed within a predetermined range. Thus, the user can photograph the object at a desired angle of view.

However, in conventional power zoom lens cameras, the zooming speed is fixed and can be changed only by manually operating a zoom lever. Consequently, the prior art cameras suffer from disadvantages. For example, when an object is to be photographed in quick succession with the angle of view being changed little by little, the number of frames which can be photographed is limited by the zooming speed and the degree of freedom with which photographing can be conducted is reduced.

SUMMARY OF THE INVENTION

In view of these circumstances, it is an object of the present invention to enable the zooming speed to be changed as desired.

The zoom lens camera according to the present invention comprises: a zooming speed input means for inputting a zooming speed; a zooming speed memory means for storing a zooming speed which is inputted through the zooming speed input means; a zooming control means for controlling the zooming operation in accordance with a zooming speed which is memorized in the zooming speed memory.

In a zoom camera having the above-described arrangement, a given zooming speed can be stored in the zooming speed memory means by operating the zooming speed input means. When the zooming operation means is operated, the memorized zooming speed is read out and set by the zooming speed setting means.

Accordingly, the user can select and set a desired zooming speed and it is therefore possible to increase the degree of freedom with which photographing can be conducted.

BRIEF DESCRIPTION OF THE DRAWINGS

The invention will be described below in detail with reference to the accompanying drawings, in which.

DESCRIPTION OF PREFERRED EMBODIMENTS

Figure 1:
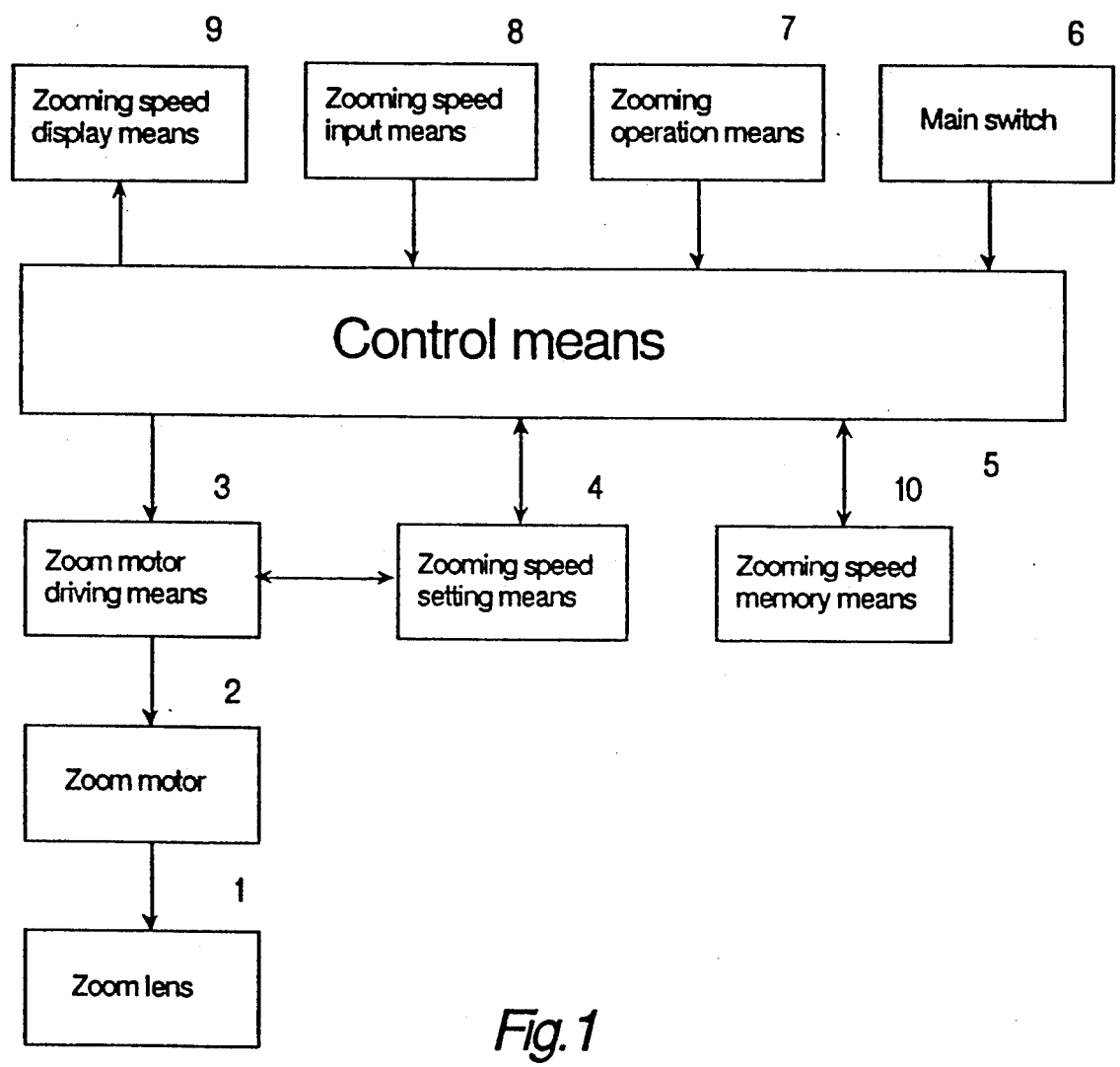
FIG. 1 is a block diagram showing an arrangement of one embodiment of the zoom lens camera according to the present invention.

FIG. 1 is a block diagram showing the arrangement of one embodiment of the zoom lens camera according to the present invention.

A zoom lens 1 is driven by a zoom motor 2. A zoom motor driving means 3 drives the zoom motor 2. A zooming speed setting means 4 sets a zooming speed and outputs set value to the zoom motor driving means 3. A control means 5 controls photographing operations, including a zooming operation.

When a main switch 6 is turned on, electrical power is supplied to various circuits, means, etc. A zooming operation means 7 is operated to execute a zooming operation, while a zooming speed input means 8 is operated to input a zooming speed. Data that is inputted through the zooming speed input means 8 is stored in a zooming speed memory means 10 and also displayed on a zooming speed display means 9.

Figure 2:
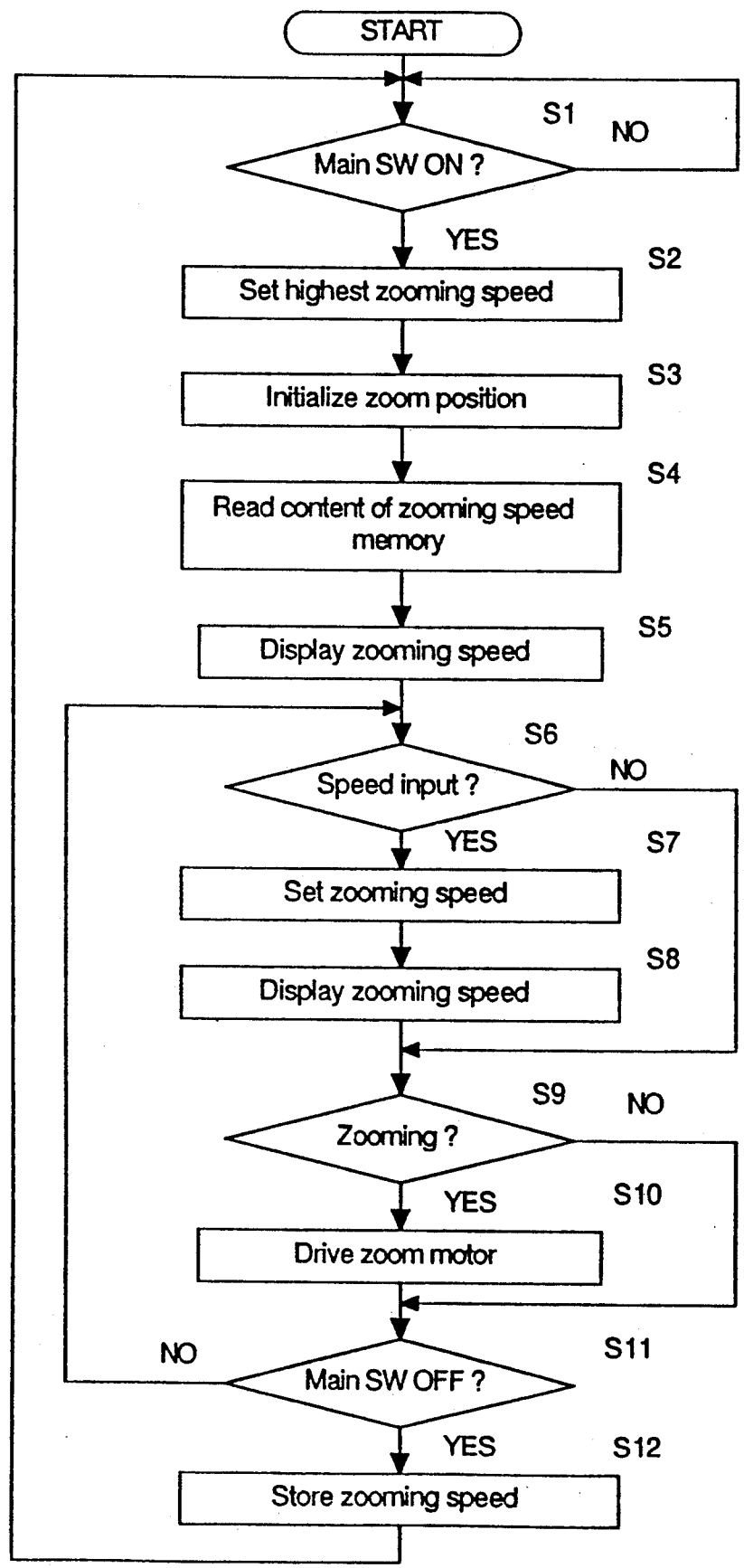
FIG. 2 is a flowchart showing a zoom processing used with the embodiment shown in FIG. 1.

The operation will now be explained with reference to the flowchart of FIG. 2, which shows a zoom processing.

When the main switch 6 is turned on, control means 5 controls the zooming speed setting means 4 so that the highest zooming speed is set (steps S1 and S2). The zoom motor driving means 3 drives the zoom motor 2 in accordance with a set value, thereby moving the zoom lens 1 to the initial position (Step S3).

Next, the control means 5 reads out a zooming speed which has previously been stored in the zooming speed memory means 10 and displays it on the zooming speed display means 9 (Step S4 and S5).

Seeing this display, the user checks whether or not the displayed zooming speed is the desired one.

When the displayed zooming speed is not the desired one, the user operates the zooming speed input means 8. When the zooming speed input means 8 is operated, the control means 5 controls both the zooming speed setting means 4 and the zooming speed display means 9 to set and display the input zooming speed (Step 6, S7 and S8).

Next, it is determining whether the zooming operation means 7 has been operated. If the determination is "YES", the zoom motor 2 is driven through the zoom motor driving means 3 to move the zoom lens 1 at the set zooming speed (Step 9 and S10).

Steps S6 and S10, that is, from the step of determining whether a zooming speed is inputted to the step of driving the zoom motor, are repeatedly executed until the main switch 6 is turned OFF.

When the main switch 6 is turned OFF, the zooming speed that is set at that time is stored in the zooming speed memory means 10 (S12).

Figure 3:
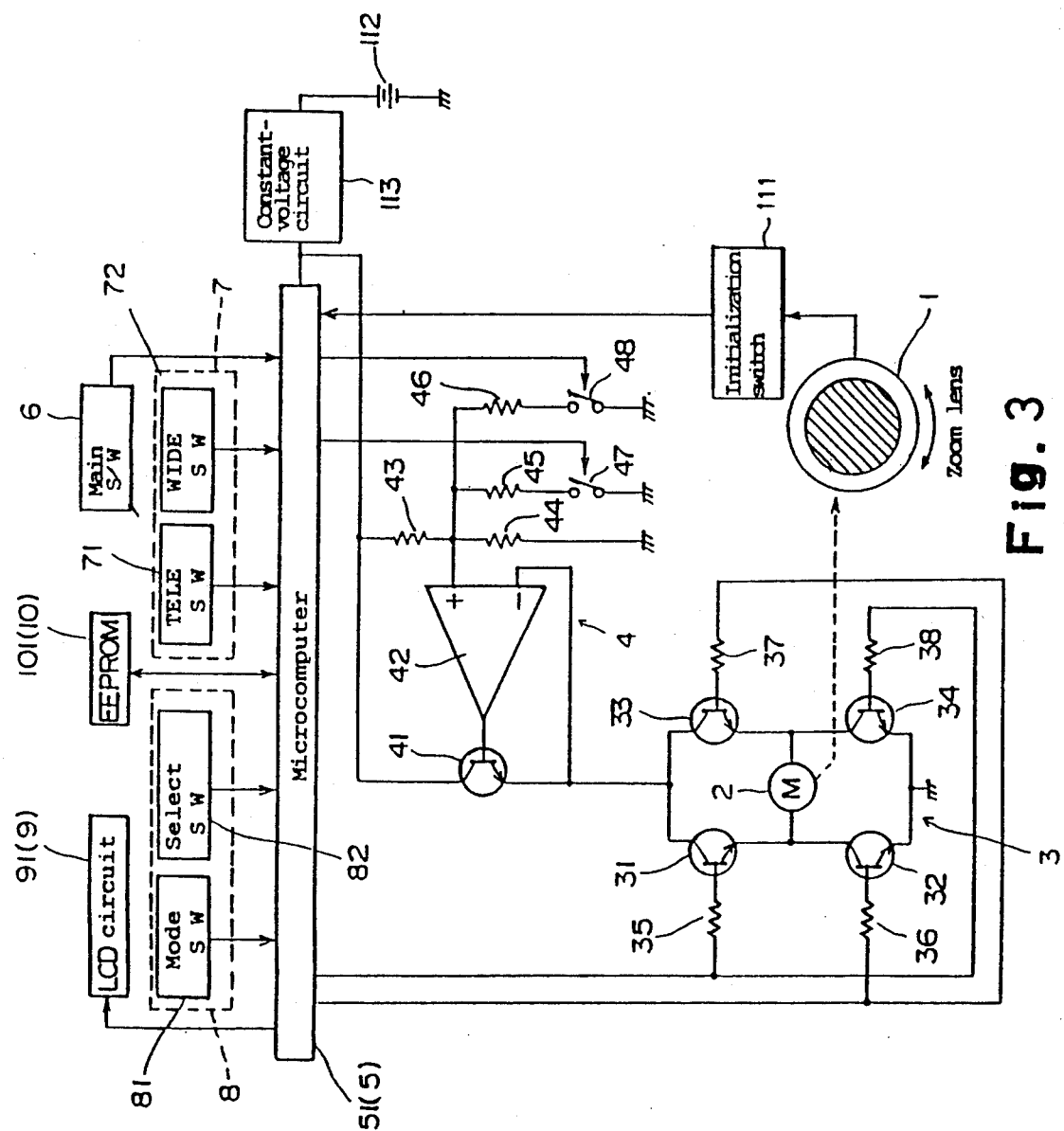
FIG. 3 is a block diagram showing the arrangement of one embodiment in which the zoom lens camera of the present invention is applied to an electronic still camera.

FIG. 3 is a block diagram showing the arrangement of one embodiment, in which the zoom lens camera of the present invention is applied to an electronic still camera. In the figure, portions or members which correspond to those in the arrangement shown in FIG. 1 are denoted by the same reference numerals.

Referring to FIG. 3, the zoom motor driving means 3 comprises NPN transistors 31 to 34 and resistors 35 to 38. The zooming speed setting means 4 comprises an NPN transistor 41, an operational amplifier 42, resistors 43 to 46 and switches 47, 48. The zooming operation means 7 comprises a TELE switch 71 and a WIDE switch 72, and the zooming speed input means 8 comprises a mode switch 81 and a select switch 82. A microcomputer 51 is employed as the control means 5, and an LCD circuit 91 functions as the zooming speed display means 9. In addition, an EEPROM 101 is employed as the zooming speed memory means 10.

Reference numeral 111 denotes an initialization switch, while 112 denotes a battery, which supplies electric power to the circuits, means, etc. through a power supply circuit 113.

Since the arrangements of the other portions are the same as those in FIG. 1, a detailed description thereof is omitted.

Figure 4:
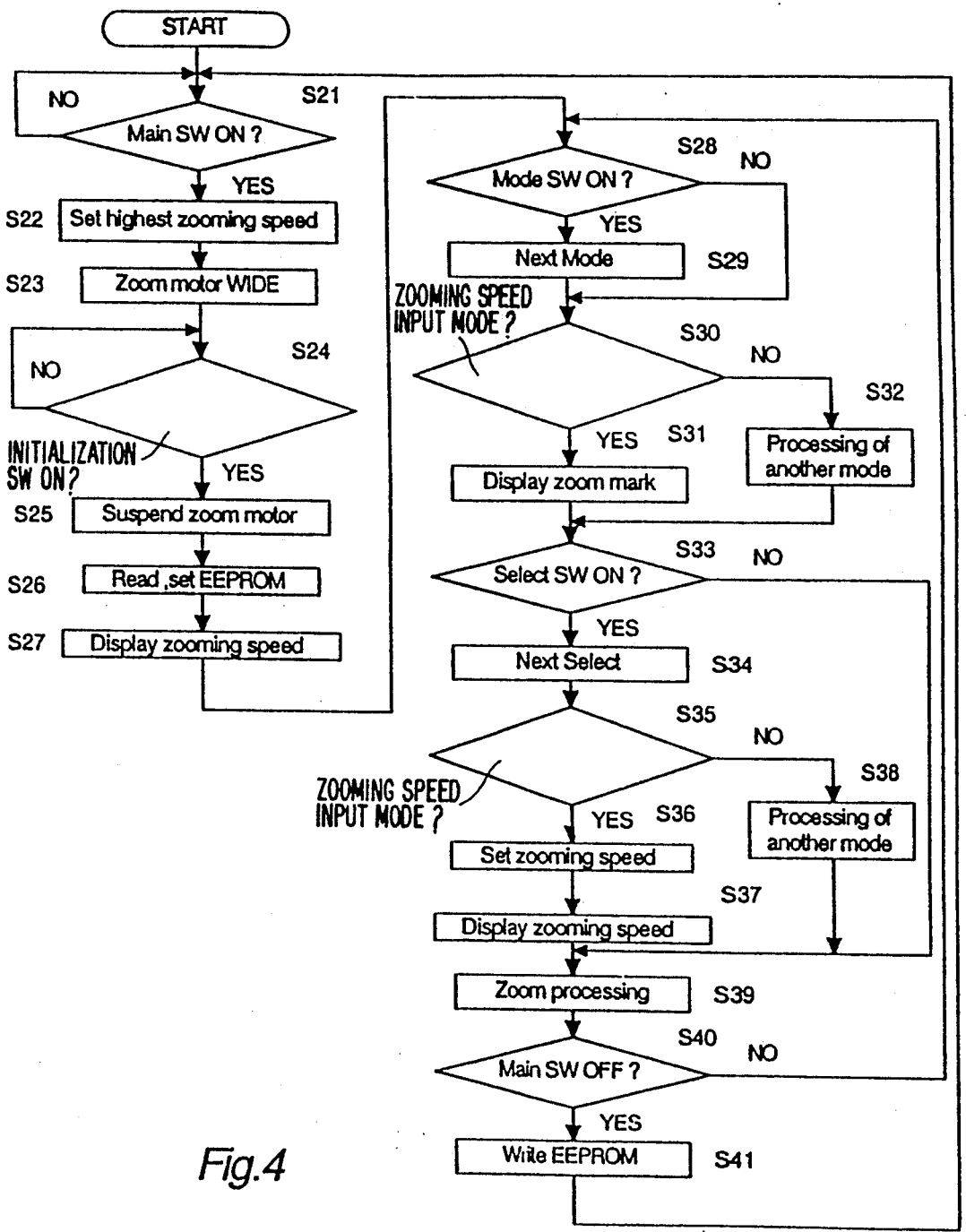
FIG. 4 is a flowchart showing a zoom processing used with the embodiment shown in FIG. 3.

The operation will now be explained with reference to the flowchart of FIG. 4 which shows a zoom processing.

First, it is determined whether the main switch 6 is on (Step 21). If it is ON, the microcomputer 51 turns OFF switches 47 and 48. Thus, the combined resistance of a resistors 44, 45 and 46 reaches the maximum value, so that the value of the voltage, supplied form the constant-voltage circuit 113, which is divided by the sum total of a combined resistance and the resistance of the resistor 43 reaches a maximum value. Accordingly, the output voltage from operational amplifier 42 reaches a maximum value, and output voltage of a NPN transistor 41 reaches the maximum. Thus, the highest zooming speed is set (Step 22).

After the highest zooming speed has been set in this way, the microcomputer 51 drives the zoom motor 2 in a direction for initialization (i.e., in the WIDE direction in this embodiment) (Step 23). For example, the microcomputer 51 turns on the NPN transistors 31 and 34 and turns OFF NPN transistors 33 and 32. Consequently, a current flows through the path that comprises the battery 112, constant-voltage circuit 113, NPN transistors, 41, 31, the zoom motor 2 and the NPN transistor 34, causing the zoom motor 2 to move the zoom lens 1 in the WIDE direction.

When the zoom lens 1 reaches a predetermined reference position, the initialization switch 111 is turned ON (Step S24). At this time, the microcomputer 51 turns OFF NPN transistors 31 to 34 to suspend the drive of the zoom lens 1 (Step 25).

Next, the microcomputer 51 reads out zooming speed data which has been stored in the EEPROM 101 and changes the switch 47 and 48 to set the readout zooming speed (S26).

If the readout data is middle speed, the switch 47 is turned OFF, while the switch 48 is turned ON, whereas, if it is the lowest speed, both switches 47 and 48 are turned ON. Thus, when the readout data is the lowest speed, the combined resistance of resistors 44, 45 and 46 reaches the minimum value, whereas, when it is the middle speed, the combined resistance if halfway-between those for the highest and lowest speeds. Accordingly, the level of the voltage that is outputted from NPN transistor 41 is set at either the lowest value or halfway-between the lowest and highest values.

Figure 5:
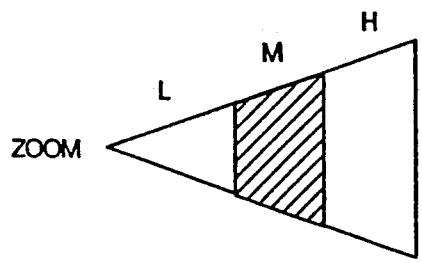
FIG. 5 is a front view showing one example of a display in the embodiment shown in FIG. 3.

Thus, the zooming speed that is read out from the EEPROM 101 is displayed on the LCD circuit 91, as exemplarily shown in FIG. 5 (Step S27). In this embodiment, the zooming speed is indicated by means of the letters "H", "M" and "L", which correspond to the highest, middle and lowest speeds, respectively, and three segments of a triangular figure which correspond to the letters, respectively. One of the three segmental regions which corresponds to the set zooming speed is lit up. FIG. 5 shows a case where the middle speed is set.

Next, it is determined whether the mode switch 81 is ON. If it is ON, a next mode is set and the set mode is displayed on the LCD circuit 91 (Steps 28 and S29).

Figure 6:
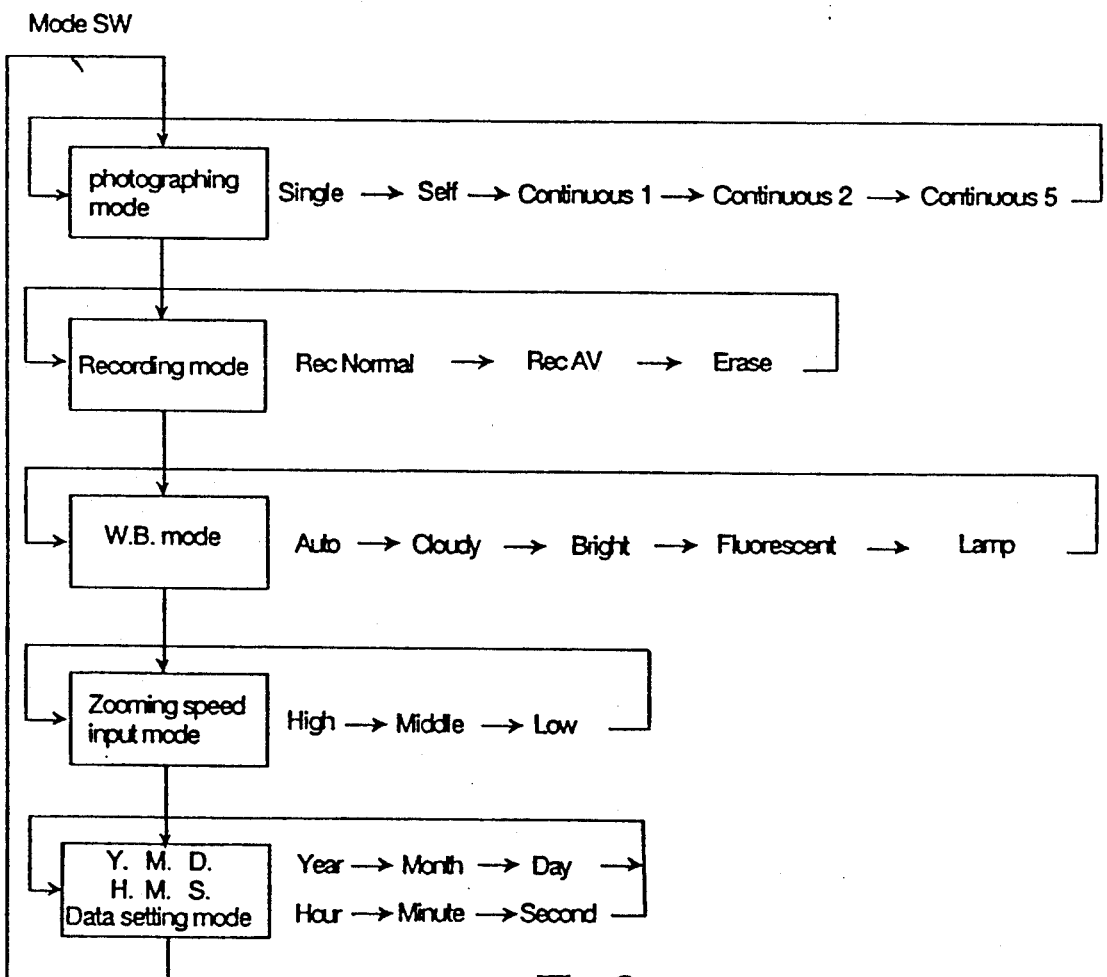
FIG. 6 shows the operations of a mode switch and select switch used with the embodiment shown in FIG. 3.

FIG. 6 shows modes which are set and displayed when the mode switch 81 is operated. More specifically, when the mode switch 81 is turned ON, the photographing mode, recording mode, white balance (WB) mode, zooming speed input mode and date setting mode are rotated in sequence.

If the zooming speed input mode is inputted by the operation of the mode switch 81, a zoom mark, such as that shown in FIG. 5, is displayed on the LCD circuit 91, whereas, if another mode is inputted, the processing of this mode is executed (Step 30, S31 and S32).

Next, it is determined whether the select switch 82 is ON (Step S33).

When the select switch 82 is operated with a given mode being selected by the operation of the mode switch 81, the selected mode changes sequentially and cyclically, as shown in FIG. 6, on the side of each mode.

In the photographing mode, for example, the following modes can be selected in sequence: Single mode, Self mode, Continuous 1 mode, Continuous 2 mode and Continuous 5 mode. In the Single mode, photographing is conducted for a single frame at a time. In the Self mode, photographing is effected using a self-timer. In the Continuous 1, 2 and 5, modes photographing is effected in quick succession at respective rates, i.e., 1 frame, 2 frames and 5 frames 034 second.

In the recording mode, the following modes are rotated: Rec Normal mode in which either audio or video data is independently recorded on a track; Rec AV mode, in which audio and video data are recorded in combination (pair) on a track; and Erase mode, in which data recorded on a track is erased.

In the white balance mode, the reference value for adjustment of the white balance is changed in the following sequence: Auto, Cloudy, Bright, Fluorescent and Lamp.

In the data mode, either the pattern of year, month and day or the pattern of hour, minute and second is displayed in response to the operation of the mode switch 81, and the display changes in response to the operation of the select switch 82 in the sequence: year, month and day, or hour, minute and second.

In the zooming speed input mode, the mode rotates in the following sequence: High (highest speed), Middle (middle speed) and Low (lowest speed).

Thus, a next mode is selected successively in response to the operation of the select switch 82, and when the selected mode is not the zooming speed input mode, the processing of this mode is executed (Step 35 and S38).

When the zooming speed input mode is selected, a zooming speed that is inputted by the operation of the select switch 82 is set by ON/OFF controlling switches 47 and 48, and the set speed is displayed on the LCD circuit 91 (Step 36 and S37).

Then, a zoom processing is executed (Step 39).

Figure 7:
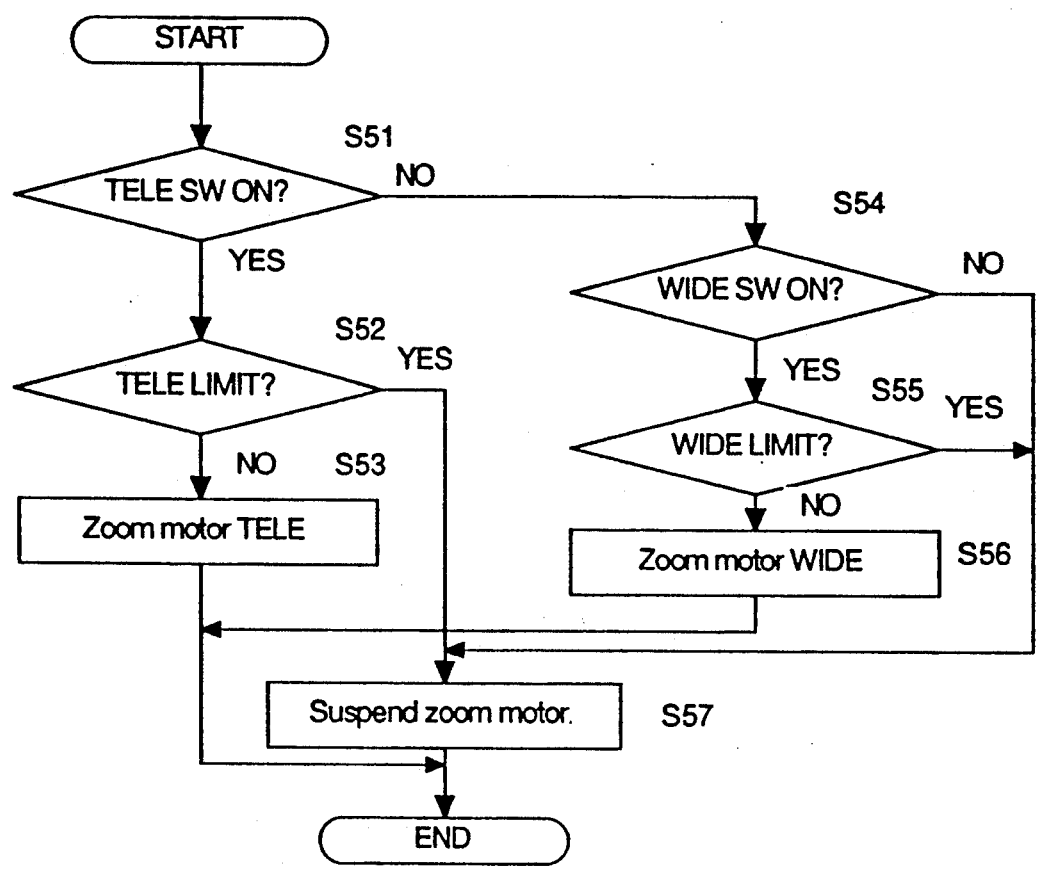
FIG. 7 is a flowchart showing in more detail the zoom processing in the flowchart shown in FIG. 4.

FIG. 7 is a flowchart showing the zoom processing.

More specifically, it is first determined whether the TELE switch 71 is ON. If it is ON and a TELE limit switch (not shown) is not on NPN transistors 33 and 32 are turned on to drive the zoom motor 2 in the TELE direction (Step 51, S52 and S53).

If the WIDE switch 72 is ON and a WIDE limit switch (not shown) is not ON, NPN transistors 31 and 34 are turned ON to drive the zoom motor 2 in the WIDE direction (Step 51, S54, S55 and S56).

When either of the limit switches is turned ON, all the NPN transistors 31 to 34 are turned OFF to suspend the zoom motor 2. When both the TELE switch 71 and the WIDE switch 72 are OFF, the zoom motor 2 remains at rest (Step 57).

After such a zoom processing has been executed, it is determined again whether the main switch 6 is ON. If it is ON, the processing of step S28 and those following it are repeated.

If the main switch 6 is off, the microcomputer 51 holds the voltage for a predetermined period of time, which is needed to complete writing of data into the EEPROM 101, and writes the presently set zooming speed, stored in its built-in memory, into the EEPROM 101(Step S41). The data that is stored in the EEPROM 101 is also held after the main switch 6 has been turned OFF or when the battery 112 is replaced.

Although in the foregoing a zooming speed is set by varying the voltage that is applied to the zoom motor 2, the pulse rate may be varied when a stepping motor is employed.

Although the zooming speed input means 8 is comprises of the mode switch 81 and the select switch 82 for simplification of the arrangement, an exclusive switch may be provided as the zooming speed input means 8.

In addition, although the initialization of the zoom lens 1 is executed at high speed in order to save time, it may be effected at an intermediate or low speed.

Although the arrangement is such that a selected zooming speed is confirmed in a relative way by means of a triangular figure, it may be displayed simply by a letter.

It should be noted that the present invention may also be applied to ordinary cameras which are designed to effect photographic recording on film.

As has been described above, the zoom lens camera of the present invention enables the selection and setting of a zooming speed and therefore permits an improvement in the operability and an increase in the degree of freedom with which photographing can be conducted.

I claim:

1. A zoom lens camera, including a zoom lens comprising:
    means for selecting one zooming speed from a plurality of zooming speeds within a zooming mode that are programmed into a semiconductor memory device; and
    means for controlling a zooming operation in accordance with said selected zooming speed so as to zoom said lens to a desired focal length at said selected zooming speed.

2. A zoom lens camera according to claim 1, wherein said zooming speed selecting means is selected from said plurality of zooming speeds by a manual operation.

3. A zoom lens camera according to claim 2, further comprising means for selecting a mode, whereby said zooming speed selecting means can select a zoom speed only when a zoom speed input mode is selected by said mode selecting means.

4. A zoom lens according to claim 1, further comprising a zoom motor which drives said zoom lens.

5. A zoom lens camera according to claim 1, wherein said zoom control means operates a zoom motor at said selected zooming speed.

6. A zoom lens camera according to claim 1, further comprising means for displaying said selected zooming speed.

7. A zoom lens camera according to claim 1, further comprising a zooming operation means which is operated when a zooming operation is conducted.

8. A zoom lens camera according to claim 1, further comprising means for setting a predetermined initial zooming speed of said lens when a power switch of the camera is closed.

9. A zoom lens camera, including a lens comprising:
    means for selecting one zooming speed from a plurality of zooming speeds within a zooming mode that are programmed into a semiconductor memory device;
    means for performing a zooming operation when a zooming operation is conducted; and
    means for setting a zooming speed of said zooming operation to a value which corresponds to said selected zooming speed so as to zoom said lens to a desired focal length at said selected zooming speed.

10. A zoom lens camera according to claim 9, wherein said zooming speed selecting means has a zooming speed that is selected from a plurality of zooming speeds by a manual operation.

11. A zoom lens camera according to claim 9, further comprising means for selecting a mode, whereby said zooming speed selecting means can select a zoom speed only when a zoom speed input mode is selected by said mode selecting means.

12. A zoom lens camera according to claim 9, further comprising a zoom motor which drives said zoom lens.

13. A zoom lens camera according to claim 9, wherein said zoom operation means operates a zoom motor at said selected zooming speed.

14. A zoom lens camera according to claim 9, further comprising means for displaying said selected zooming speed.

15. A zoom lens camera according to claim 9, further comprising means for setting a predetermined initial zooming speed of said lens when a power switch of the camera is closed.

16. A camera, comprising:
    means for selecting a rate of movement of a lens of said camera from a plurality of available movement rates within a zooming mode that are programmed into a semiconductor memory device; and
    means for setting a rate of movement of said lens based upon said selected movement rate so as to zoom said lens to a desired focal length at said selected movement rate.

17. The camera of claim 16, further comprising means for indicating said selected rate of movement.

18. The camera of claim 16, further comprising a motor that operates to move said lens based upon said set rate of movement.

19. The camera of claim 16, wherein said lens comprises a zoom lens and said rate of movement comprises a zooming speed.

20. The camera according to claim 16, further comprising means for setting a predetermined initial rate of movement of said lens when a power switch of said camera is closed.

21. A camera having a variable speed zooming lens, comprising:

a switch that selects a zooming speed of said lens from a plurality of zooming speeds within a zooming mode that are programmed into a semiconductor memory; and a switch that sets a zooming speed of said lens based upon said selected zooming speed so as to zoom said lens to a desired focal length at said selected zooming speed.

22. The camera of claim 21, further comprising an indicator that indicates said selected zooming speed.

23. The camera of claim 21, further comprising a zoom motor that changes a focal length of said zoom lens according to said selected zooming speed.

24. A camera according to claim 21, further comprising means for setting a predetermined initial zooming speed of said lens when a power switch of the camera is closed.

25. A zoom lens camera, including a zoom lens comprising:

a switch that selects a zoom lens zooming speed form a plurality of zooming speeds within a zooming mode that are programmed into a zooming speed storage device; and a controller that controls a zooming operation of said zoom lens in accordance with said selected zooming speed so as to zoom said lens to a desired focal length at said selected zooming speed.

26. The zoom lens camera according to claim 25, further comprising means for setting a predetermined initial zooming speed of said zoom lens when a power switch of the camera is closed.

* * * * *

UNITED STATES PATENT AND TRADEMARK OFFICE
CERTIFICATE OF CORRECTION

PATENT NO. : 5,311,230
DATED : May 10, 1994
INVENTOR(S) : Kimiaki OGAWA

It is certified that error appears in the above-indentified patent and that said Letters Patent is hereby corrected as shown below:

At column 8, line 5 (claim 25, line 3) of the printed patent, change "form" to ---from---.

Signed and Sealed this

Fifth Day of September, 1995

Attest:

BRUCE LEHMAN

Attesting Officer

Commissioner of Patents and Trademarks